(12) United States Patent
Nishida et al.

(10) Patent No.: US 7,641,377 B2
(45) Date of Patent: Jan. 5, 2010

(54) DISPLAY DEVICE

(75) Inventors: Yoshihide Nishida, Kikuchi-gun (JP); Yuji Tsuchiyama, Kikuchi-gun (JP); Masayuki Kawano, Kikuchi-gun (JP)

(73) Assignee: Mitsubishi Denki Kabushiki Kaisha, Chiyoda-Ku, Tokyo (JP)

( * ) Notice: Subject to any disclaimer, the term of this patent is extended or adjusted under 35 U.S.C. 154(b) by 97 days.

(21) Appl. No.: 11/032,058

(22) Filed: Jan. 11, 2005

(65) Prior Publication Data

US 2005/0190577 A1    Sep. 1, 2005

(30) Foreign Application Priority Data

Feb. 27, 2004    (JP) .............................. 2004-054351

(51) Int. Cl.
*F21V 7/04* (2006.01)
(52) U.S. Cl. ..................... 362/633; 362/632; 362/634
(58) Field of Classification Search ............... 362/26, 362/581, 227, 632, 633, 634; 349/58, 61, 349/62, 64
See application file for complete search history.

(56) References Cited

U.S. PATENT DOCUMENTS

| | | | | |
|---|---|---|---|---|
| 5,729,310 | A * | 3/1998 | Horiuchi et al. | 349/62 |
| 6,392,724 | B2 * | 5/2002 | An et al. | 349/58 |
| 6,609,808 | B2 * | 8/2003 | Chen | 362/632 |
| 6,626,550 | B2 * | 9/2003 | Choi | 362/632 |
| 6,634,761 | B2 * | 10/2003 | Ichikawa | 362/600 |
| 6,734,928 | B2 * | 5/2004 | Ito et al. | 349/58 |
| 6,814,458 | B2 * | 11/2004 | Kim et al. | 362/632 |
| 6,828,721 | B2 * | 12/2004 | Wakita | 313/491 |
| 6,854,858 | B2 * | 2/2005 | Jeong et al. | 362/633 |
| 7,050,128 | B2 * | 5/2006 | Lee et al. | 349/58 |
| 7,139,046 | B2 * | 11/2006 | Katahira | 349/58 |
| 2003/0043312 | A1 | 3/2003 | Nishida et al. | |
| 2003/0223020 | A1 * | 12/2003 | Lee | 349/58 |
| 2004/0257791 | A1 * | 12/2004 | Chen et al. | 362/31 |

(Continued)

FOREIGN PATENT DOCUMENTS

JP    4-157423    5/1992

(Continued)

OTHER PUBLICATIONS

Chinese Office Action dated Jan. 5, 2007.

(Continued)

*Primary Examiner*—Jacob Y Choi
(74) *Attorney, Agent, or Firm*—Buchanan Ingersoll & Rooney PC

(57) ABSTRACT

An object of the present invention is to provide a display device with high withstand mechanical-shock property, and improve quality of the product by controlling occurrence of display defects such as uneven luminance. The display device includes a light guiding plate 1 being provided a light source 5 on an upright surface 1*b*, optical sheets 2 being provided at a side of light emitting surface of said light guiding plate, a light source supporting member being provided for supporting said light source and a frame 4 having a protrusion 4*a* for supporting said light guiding plate from the upright surface 1*b* of said light guiding plate 1. Furthermore, a projection is formed at optical sheets, and cut-out, which includes the projection therebetween, is provided at the frame 4.

12 Claims, 3 Drawing Sheets

U.S. PATENT DOCUMENTS

2004/0263716 A1 * 12/2004 Lee et al. .................. 349/61

FOREIGN PATENT DOCUMENTS

| JP | 11-271766 | 10/1999 |
| JP | 11-281966 | 10/1999 |
| JP | 2001-126523 | 5/2001 |
| JP | 2003-121816 | 4/2003 |
| JP | 2003-066420 * | 5/2003 |
| JP | 2004-055232 | 2/2004 |

OTHER PUBLICATIONS

Chinese Office Action dated Sep. 19, 2008.

* cited by examiner

PART B

DISPLAY DEVICE

FIELD OF THE INVENTION

The present invention relates to a display device, which is provided with a light guiding plate having a light source on an upright surface and supports the light guiding plate from the upright surface side.

BACKGROUND OF THE INVENTION

A conventional display device, for instance a display device employing liquid crystal, is provided with a light guiding plate at the opposing surface of a display surface of a liquid crystal display for guiding light to a liquid crystal panel. On an upright surface of the light guiding plate, there is provided a light source such as a line light source, and a reflective member for gathering light from the light source into the upright surface of the light guiding plate and being provided as covering the above-mentioned light source. Between the liquid crystal panel and light guiding plate, there are provided optical sheets, such as a diffusing sheet, for having homogeneous irradiation of the liquid crystal display by diffusing light from the light source. In order to control horizontal movements of the optical sheet, there is provided a ridge which supports the light source, the reflective member and optical sheets on a frame. (For example, see Japanese Unexamined Patent Publication No. 121816/2003).

In addition, there is provided a ridge on the frame, and in order to support the light guiding plate, a part of the upright surface of the light guiding plate is provided as contacting the ridge on the frame. Then, the interval of the light guiding plate and retaining member at the ridge of the frame is narrower than the interval of an end of the reflective member and light guiding plate. (For example, see Japanese Unexamined Patent Publication No. 126523/2001.)

In the above-mentioned conventional technique of Japanese Unexamined Patent Publication No. 121816/2003, the ridge located at the frame controls the movements of the optical sheets, and there is no disclosure nor indication with respect to supporting the light guiding plate through a ridge. When the ridge is located on the frame for supporting the light guiding plate as shown in Japanese Unexamined Patent Publication No. 126523/2001, there has been a problem of occurrence of a display defect such as uneven luminance caused by a scratch of the upright surface of the light guiding plate through contacting the end of the reflective member to the upright surface of the light guiding plate. The present invention is provided in view of solving above-mentioned problems, and objects are to improve withstand mechanical-shock property, control occurrence of a display defect such as uneven luminance and improve quality of display device.

SUMMARY OF THE INVENTION

According to the present invention, there is provided a light guiding plate having a light source on an upright surface, an optical sheet being provided at a light emitting side of above-mentioned light guiding plate, a light source supporting member being provided for supporting above-mentioned light source and a frame having a protrusion which supports the light guiding plate from upright surface of the light guiding plate.

The display device of the present invention is composed of the light guiding plate having the light source on the upright surface, the optical sheet being provided at the light emitting side of above-mentioned light guiding plate, the light source supporting member being provided for supporting above-mentioned light source and the frame having the protrusion which supports the light guiding plate from upright surface of the light guiding plate. Therefore, it is possible to improve the withstand mechanical-shock property and control occurrence of the display defect such as uneven luminance.

DETAILED DESCRIPTION

There are explanations of applicable Embodiments of the present invention in following. The following explanation is to explain Embodiments of the present invention, and it is to be understood that the present invention is not limited only to the following Embodiments. In order to provide a clear understanding, following explanation is properly abbreviated and simplified. In addition, it is possible for a person skilled in the art to make various changes and modifications of each element of following Embodiments without departing from the spirit and scope of the present invention.

Embodiment 1

Figure 1A:
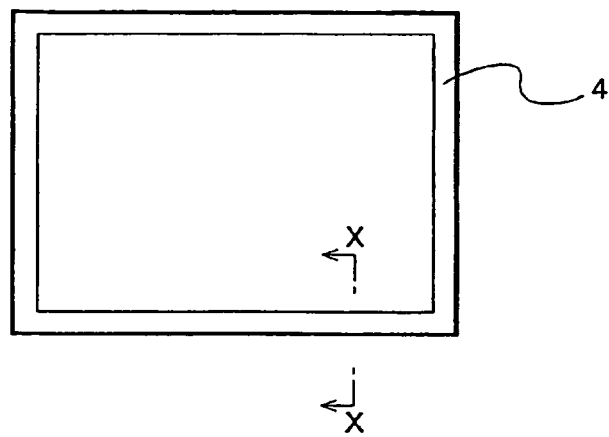
FIG. 1(a) is a front elevation of a display device of present Embodiment shown from the display surface side and FIG. 1(b) is a section view taken along X-X line of FIG. 1(a)
Figure 1B:
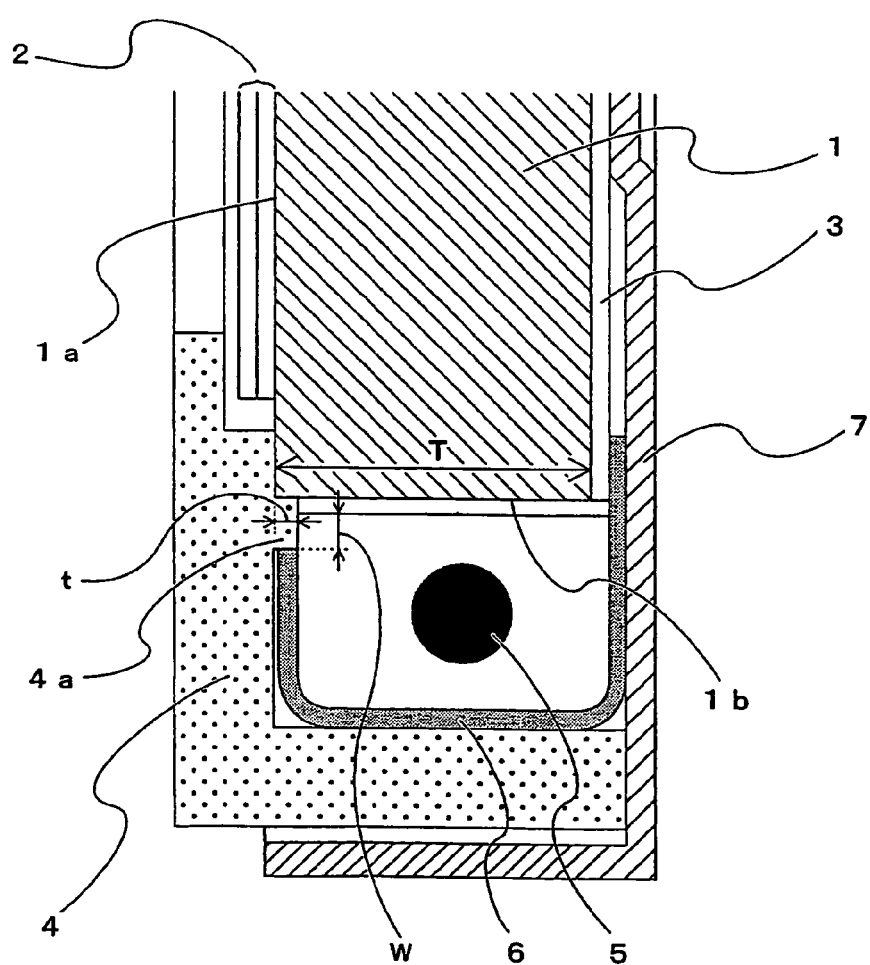

FIG. 1(a) is a front elevation of a display device of present Embodiment shown from the display surface side, and FIG. 1(b) is a sectional view taken along X-X line of FIG. 1(a) of the present Embodiment. There is provided a light source 5 such as a line light source at an upright surface 1b of the light guiding plate 1, and a light source supporting member 6 for supporting the light source 5 as shown in FIG. 1. The light source supporting member 6 also has a function of making light effectively received at the upright surface 1b of the light guiding plate through reflecting light which is emitted from the light source 5. There are also provided optical sheets 2 such as a diffusion sheet for obtaining homogeneous irradiation of a liquid crystal panel by diffusing light from the light source 5 and a lens sheet for improving luminance by polarizing a characteristic of radiation of light which is emitted from light source 5. In addition, on an opposing side of a light emitting surface 1a of the light guiding plate 1, there is provided a reflective sheet 3 for effectively gathering light which is emitted from light source 5 on the light emitting surface 1a of light guiding plate 5. Furthermore, there are provided a light guiding plate 1, optical sheets 2, and primary frame 4 and secondary frame 7 for supporting the light source supporting member 6.

As shown in FIG. 1(b), the primary frame 4 is composed of a protrusion 4a. And the light guiding plate 1 is supported by the primary frame 4 from the upright surface 1b through the protrusion 4a. Through this arrangement, intensity of a perimeter located at an opening of the primary frame (light emitting surface) is increased, and it is possible to produce a product with high withstand mechanical-shock property. In addition, through providing respectively the protrusion 4a at four sides of the primary frame 4, it is possible to obtain higher withstand mechanical-shock property. Then, the protrusion served as a positional determinant and support for the light guiding plate 1 becomes unnecessary, and light source 5 can be located four sides of the primary frame 4, therefore, it is possible to obtain higher luminance.

Through providing one end of the light source supporting member 6 at the protrusion 4a of the primary frame 4 and either being contacted or close to the opposing surface to the surface, which supports the upright surface 1b of the light guiding plate 1, it is possible to prevent the upright surface 1b of the light guiding plate 1 from being scratched which is cased by contacting one end of the light source supporting member 6 to the upright surface 1b of the light guiding plate 1. Then, it is possible to control occurrence of the display defects such as uneven luminance.

When the height of the protrusion is to be t and the thickness of the upright surface of the light guiding plate is to be T, the protrusion 4a of the primary frame 4 is preferably in a range of $0.05\ T \leq t \leq 0.3\ T$. by having the height t of the protrusion 4a to be more than 0.05 T, it is possible to certainly prevent the upright surface 1b of the light guiding plate 1 from being scratched which is caused by contacting one end of the light source supporting member 6 to the upright surface 1b of the light guiding plate 1 and improve accuracy of work for the protrusion 4a. On the other hand, through having the height t of the protrusion 4a to be less than 0.3 T, light from the light source 5 is effectively received at the upright surface 1b of the light guiding plate 1. In Embodiment 1, the height of the protrusion 4a of the primary frame 4 is 0.5 mm to 3 mm, width w of the protrusion 4a of the primary frame 4 is 1 mm to 2 mm and the thickness T of the upright surface 1b of the light guiding plate 1 is 10 mm.

Although not shown in Figures, through covering a surface which supports the upright surface 1b of the light guiding plate 1 and a surface which is located opposing to the light source 5 at the protrusion 4a of the primary frame 4 by a reflective member, it is possible to effectively gather light which is emitted from the light source 5 at the upright surface 1b of the light guiding plate 1.

Through the display device in Embodiment 1, it is possible to produce a product with high withstand mechanical-shock property, and it is possible to prevent the upright surface 1b of the light guiding plate 1 from being scratched which is caused by contacting one end of the light source supporting member 6 to the upright surface 1b of the light guiding plate 1, and an occurrence of uneven luminance is controlled. Therefore through this arrangement, the quality of the product is improved.

Embodiment 2

Figure 2A:
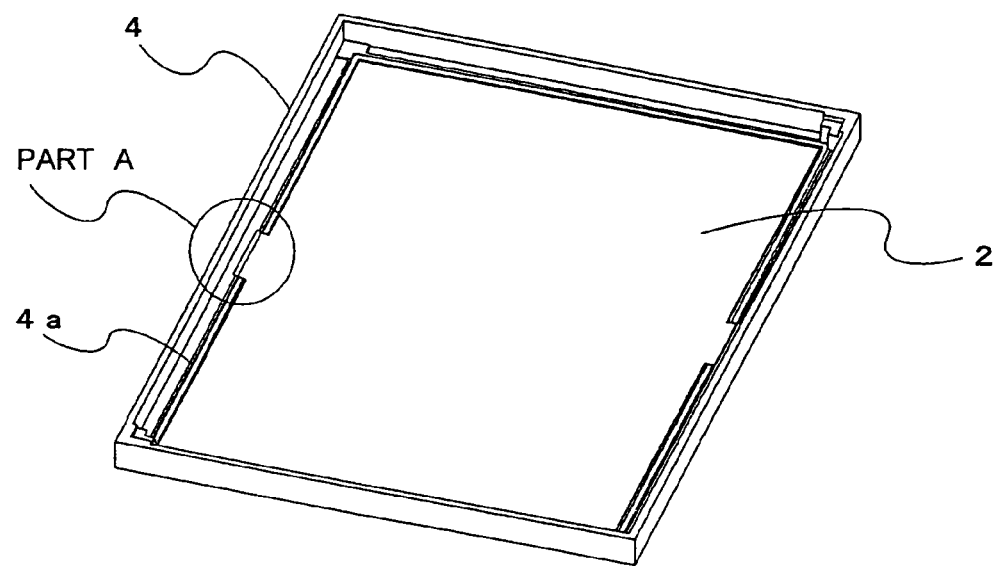
FIG. 2(a) is a perspective view of an opposing side of a display surface of the display device in Embodiment 2 and FIG. 2(b) is a detail view of part A of FIG. 2(a)
Figure 2B:
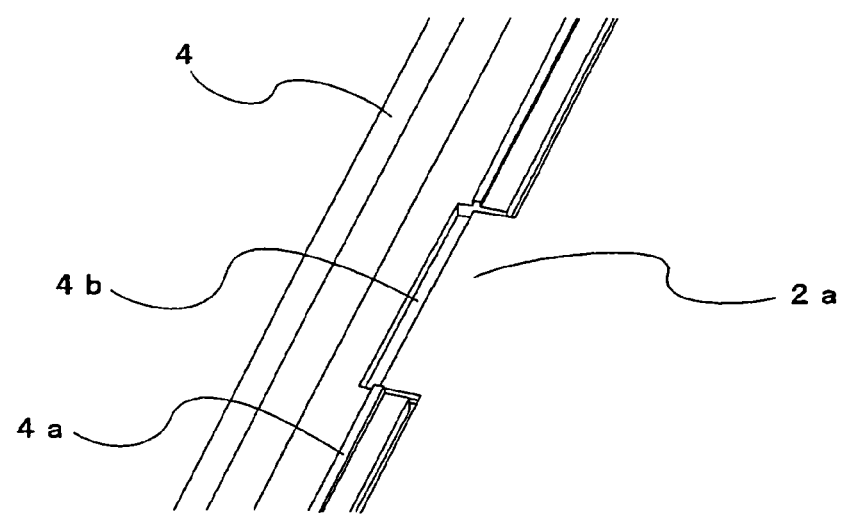
Figure 3A:
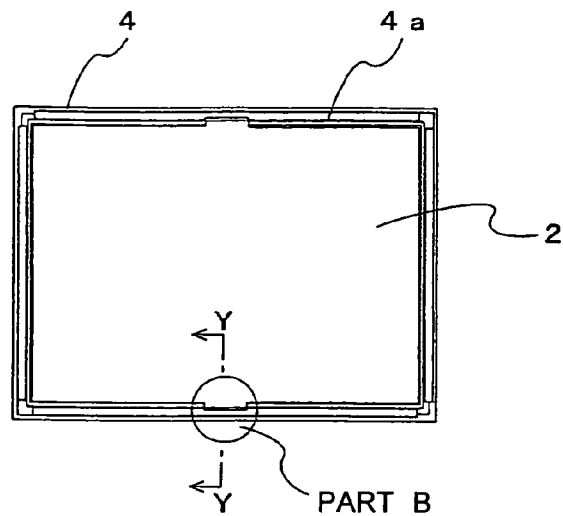
FIG. 3(a) is a plan view of an opposing side of a display surface of the display device in Embodiment 2 and FIG. 3(b) is a detail view of part B of FIG. 3(a)
Figure 3B:
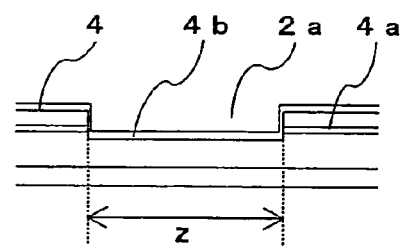
Figure 4:
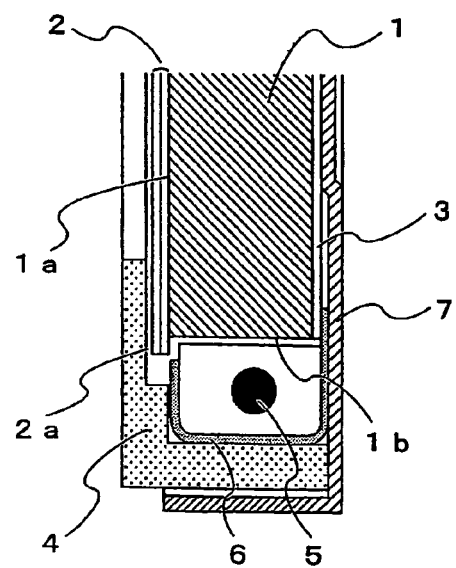
FIG. 4 is a sectional view taken along Y-Y line of FIG. 3(a) being composed of a light guiding plate 1, reflective sheet 3, light source 3, light source supporting member 6 and secondary frame 7.

Embodiment 2 is explained in accordance with FIGS. 2(a), 2(b), 3(a), 3(b) and 4. FIG. 2(a) is a perspective view of the display device showing an opposing side of the display surface, FIG. 2(b) is a detail view of part A of FIG. 2(a), FIG. 3(a) is a plan view of the display device showing an opposing side of the display surface, FIG. 3(b) is a detail view of part B of FIG. 3(a) and FIG. 4 is a section view taken along Y-Y line of FIG. 3(a) combined with the light guiding plate 1, reflective sheet 3, light source 5, light source supporting member 6 and secondary frame 7. The same numerals in FIGS. 2, 3 and 4 correspond to the same numerals in FIG. 1. FIGS. 2 and 3 show arrangements provided only with the optical sheets 2 and primary frame 4.

As shown in FIGS. 2, 3 and 4, the primary frame 4 is composed of, for instance, a cut-out 4b lengthwise with length of z (20 mm to 40 mm) as including the protrusion 4a and a projection 2a, which is formed at the optical sheets 2, therebetween. Through this arrangement, it becomes easier to determine the position of the optical sheets 2. In addition, since the cut-out 4b formed at the primary frame 4 is composed in such a manner as to include the projection 2a of the optical sheets 2, in case there is a gap on the surface in which the light emitting surface 1a of the light guiding plate 1 and the primary frame 4 is contacted, the optical sheets 2 are caught by the protrusion 4a of the primary frame 4. Therefore, it is possible to control movements of the optical sheets 2.

As shown in FIGS. 2, 3 and 4, the cut-out 4b formed at the primary frame 4 is composed of the protrusion 4a of the primary frame 4. The cut-out 4b is provided in an area in which the projection 2a formed at the optical sheets 2 can be included therebetween and not penetrated the primary frame 4 at a direction of the height t of the protrusion 4a of the primary frame 4. However, the same effects can be obtained when the cut-out 4b is formed so as to penetrate the primary frame 4.

In addition, it is illustrated in Embodiment 2 that the cut-out 4b is provided at two opposing sides of the primary frame 4, however, it is possible to surely control movements of the optical sheets 2 when the cut-out 4b is formed at all four sides of the primary frame 4.

Accordingly, the display device in Embodiment 2 is composed of the cut-out 4b at the primary frame 4 having the protrusion 4a, hence it becomes easier to determine the position of the optical sheets 2 and possible to control movements of the optical sheets 2. Therefore, through this arrangement, it is possible to improve quality of the product. Other effects are the same as illustrated in Embodiment 1.

In Embodiments 1 and 2, the light sources 5 can be formed at four sides of the upright surfaces 1b of the light guiding plate 1 with no ineffectiveness, and it is possible to obtain the display device with high luminance by preventing a scratch on the side 1b of the light guiding plate 1.

In addition in Embodiments 1 and 2, a fluorescent light such as cold cathode tube is usually employed as the light source 5 which is provided at an upright surface of the light guiding plate. However, the light source is not limited only to a fluorescent light, and for instance, when a white LED (light emitting diode) or an LED having light emitting color of R, G and B is employed, it is expected to obtain a product with high withstand mechanical-shock property. Also, it is possible to prevent a scratch on the upright surface 1b of the light guiding plate 1 caused by contacting one end of the light source supporting member 6 to the upright surface 1b of the light guiding plate 1, therefore, it becomes possible to control occurrence of uneven luminance.

What is claimed is:

1. A display device comprising:
a light guiding plate including a light-emitting surface and provided with a light source at a light-receiving surface thereof;
optical sheets provided at a side of the light emitting surface of said light guiding plate;
a light source supporting member located inside a frame and supporting said light source, said light source supporting member having a base portion and an extending portion which extends from the base portion; and
the frame supporting said light guiding plate on the light emitting surface of said light guiding plate and including a protrusion having a first surface for supporting said light guiding plate on the light-receiving surface of said light guiding plate, and said protrusion having an opposing surface;

wherein the extending portion has an end face that substantially overlaps the opposing surface of the protrusion;

wherein said light guiding plate and said optical sheets are held by said frame, said opposing surface being in contact or close to an end of said light source supporting member and said protrusion protruding from said frame in a direction of a thickness of the light guiding plate.

2. The display device of claim 1, wherein said protrusion has a height t and the light-receiving surface of the light guiding plate has a thickness T, and wherein the height t is in a range of $0.05\,T \leq t \leq 0.3\,T$.

3. The display device of claim 1, wherein said optical sheets are provided with a projection, and said frame is provided with a cut-out which encompasses the projection formed at said optical sheets.

4. The display device of claim 3, wherein said cut-out is provided at two opposing sides of said frame.

5. The display device of claim 3, wherein the light source is provided at light-receiving surfaces of four sides of said light guiding plate.

6. The display device of claim 1, wherein said light source is provided at light-receiving surfaces of four sides of said light guiding plate.

7. The display device of claim 2, wherein said light source is provided at light-receiving surfaces of four sides of said light guiding plate.

8. The display device of claim 3, wherein said light source is provided at light-receiving surfaces of four sides of said light guiding plate.

9. The display device of claim 4, wherein said light source is provided at light-receiving surfaces of four sides of said light guiding plate.

10. The display device of claim 1, wherein the light source supporting member reflects light from the light source toward the upright surface.

11. The display device of claim 1, wherein said protrusion engages said light-receiving surface of said light-guiding plate.

12. The display device of claim 1, wherein the protrusion has a first surface which supports said light-receiving surface of the light guiding plate and has an opposing surface, and wherein one end of said light source supporting member is provided at said protrusion and is located in contact with or near the opposing surface, the light-receiving surface of the light guiding plate being separated from said light source supporting member by said protrusion.

* * * * *